(12) United States Patent
Niewiera

(10) Patent No.: US 8,360,226 B2
(45) Date of Patent: Jan. 29, 2013

(54) METHOD AND APPARATUS FOR THE CONTAMINATION-FREE TREATMENT OF SHOCK-SENSITIVE GLASS PLATES IN ULTRA CLEAN ROOMS

(75) Inventor: Wolfgang Niewiera, Donauwoerth (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 298 days.

(21) Appl. No.: 12/740,104

(22) PCT Filed: Oct. 24, 2008

(86) PCT No.: PCT/DE2008/001738
§ 371 (c)(1),
(2), (4) Date: Apr. 27, 2010

(87) PCT Pub. No.: WO2009/056103
PCT Pub. Date: May 7, 2009

(65) Prior Publication Data
US 2011/0005903 A1    Jan. 13, 2011

(30) Foreign Application Priority Data
Oct. 31, 2007   (DE) .......................... 10 2007 052 027

(51) Int. Cl.
*B65G 49/06*    (2006.01)
(52) U.S. Cl. .......................... 198/373; 198/791; 198/789
(58) Field of Classification Search .......................... None
See application file for complete search history.

(56) References Cited

U.S. PATENT DOCUMENTS

| 5,293,984 A | 3/1994 | Lucas |
| 5,317,859 A * | 6/1994 | Schneider et al. .............. 53/534 |
| 5,985,029 A * | 11/1999 | Purcell .......................... 118/324 |
| 6,601,410 B1 * | 8/2003 | Bogert et al. .................. 65/260 |
| 6,644,459 B2 * | 11/2003 | van Leeuwen et al. .... 198/370.1 |
| 7,428,959 B2 * | 9/2008 | Jung et al. ..................... 198/493 |
| 2007/0098539 A1 | 5/2007 | Chang et al. |

FOREIGN PATENT DOCUMENTS

| DE | 102005039453 | 3/2007 |
| DE | 202007003907 | 6/2007 |
| EP | 1541296 | 6/2005 |
| EP | 1591427 | 11/2005 |
| EP | 1647532 | 4/2006 |
| FR | 2793780 | 11/2000 |
| GB | 1258625 | 12/1971 |
| JP | 06348025 A | 12/1994 |
| JP | 2000031238 A | 1/2000 |
| JP | 2003226425 A | 8/2003 |
| JP | 2004253808 A | 9/2004 |
| JP | 2006150538 A | 6/2006 |

OTHER PUBLICATIONS

Japanese Patent Office; "Notice of Reasons for Rejection" mailed Feb. 15, 2012, pp. 1-5.

* cited by examiner

*Primary Examiner* — Kavel Singh
(74) *Attorney, Agent, or Firm* — Duane Morris LLP; J. Rodman Steele, Jr.; Gregory M. Lefkowitz

(57) ABSTRACT

Disclosed are a method and an apparatus for the contamination-free, precisely defined, horizontal orientation and subsequent transfer of thin, shock-sensitive crystalline plates, especially glass plates (11), into a defined vertical position. The glass plates (9) are oriented, transferred, and fed in the correct position for further processing without using an industrial robot and without being contaminated by humans. The apparatus is inexpensive and safe to operate.

16 Claims, 6 Drawing Sheets

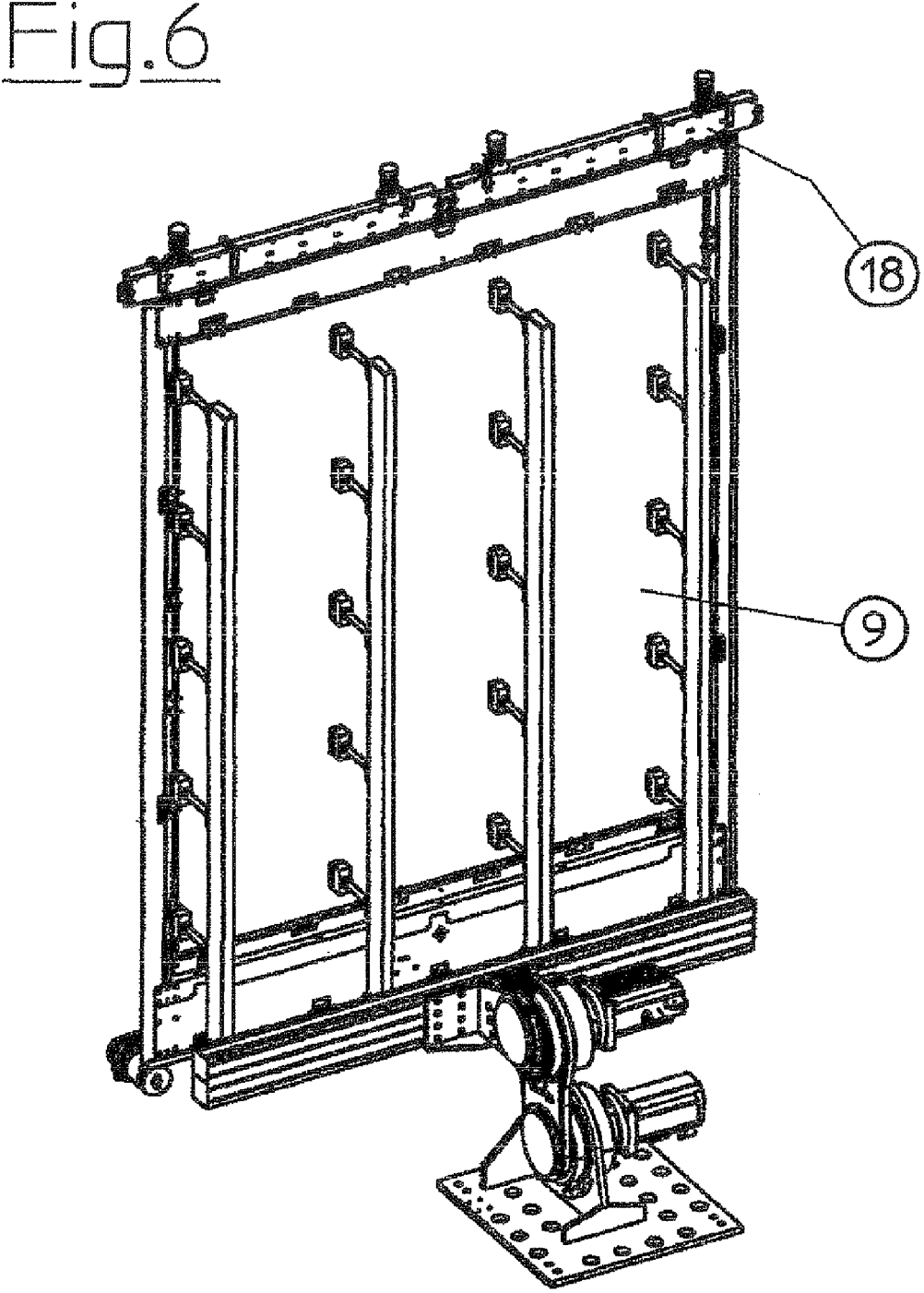

METHOD AND APPARATUS FOR THE CONTAMINATION-FREE TREATMENT OF SHOCK-SENSITIVE GLASS PLATES IN ULTRA CLEAN ROOMS

CROSS-REFERENCE TO RELATED APPLICATIONS

This application is a §371 national stage entry of International Application No. PCT/DE2008/001738, filed Oct. 24, 2008, which claims priority to German Patent Application No. 10 2007 052 027.3, filed Oct. 31, 2007, both of which are hereby incorporated by reference.

BACKGROUND

The processing of crystalline structures, in particular glass plates, in ultra-clean rooms was initially necessary in the technique for producing semiconductors. Over time, photovoltaics and the production of TFT screens, inter alia, have proved to be important fields of application for this production technique.

Tailored solar modules make accurate integration into building grids and profiles possible. Semitransparent solar cells, but also opaque solar cells with transparent areas, make photovoltaic glazings appear to be flooded with light. Here, the solar cells often take on the desired effect of protection against the sun and glare.

The production of such photovoltaic systems requires operating conditions such as those which are conventional primarily in the production of integrated electronic circuits. However, in the production of photovoltaic systems, these so-called clean room conditions additionally make it necessary to handle shock-sensitive glass plates with a large surface area.

The production and further processing of shock-sensitive plates is also required in the production of large flat screens, and in a large quantity. Modern flat screens are increasingly replacing the old tube monitors, and are also becoming less and less expensive.

These are based on TFT/LCD technology. In this context, LCD (Liquid Crystal Display) represents the use of liquid crystals in the individual pixels of the screen, and TFT stands for Thin Film Transistor. The TFTs are very small transistor elements which control the orientation, and therefore the light transmission, of the liquid crystals.

A flat-screen display consists of numerous pixels. In turn, each pixel consists of 3 LCD cells (subpixels), corresponding to the colors of red, green and blue. A 15-inch screen (measured diagonally) contains about 800,000 pixels or roughly 2.4 million LCD cells.

For understanding of the mode of operation:

A liquid crystal cell (LCD cell) works in a similar manner to polaroid sunglasses. If two polaroid glasses are held one above the other and then twisted with respect to each other, it is initially possible to see less and less and then nothing at all. This effect arises because polaroid glass is transparent only to light waves which vibrate in a specific plane. If two such glasses are held one above the other and twisted through 90° with respect to each other, some of the light can still pass through the first glass, but no longer through the second glass, since this is then transverse to the incoming light waves and filters them out.

An LCD cell works on the same principle. It consists of two polaroid glasses which are twisted through 90° with respect to each other and through which no light can therefore pass, in accordance with that explained above. A layer of liquid crystals, which has the natural property of turning the vibration plane of light, is located between these two polaroid glasses. This layer of liquid crystals is just thick enough that the light passing through the first polaroid glass is turned back through 90°, and can therefore also pass through the second polaroid glass, i.e. is visible to the viewer.

If the liquid crystal molecules are then turned away from their natural position by the application of an electrical voltage, less light passes through the cell and the corresponding pixel becomes dark. The corresponding voltage is produced by a TFT element which is part of every LCD cell. The light for the LCD display is produced in the rear part of the screen housing by small fluorescent tubes, as are used on a larger scale for illuminating rooms.

Since each pixel has three color filters for the colors of red, green and blue, the control of the transparency of these filters means that each pixel can assume a desired color mixture or a desired color.

For standard office applications, flat screens have outstanding sharpness and a sufficient color quality. In ergonomic terms, TFTs also have much to offer: smaller space requirement, a power consumption which is only a third of that of a tube monitor and significantly lower emission of radiation.

As is conventional in microelectronics, the production of TFT screens requires so-called ultra-clean rooms. This is necessary because, in view of the small size of the line-carrying structures, even small particles can cause line interruptions during the production process. In the production of a TFT screen, such a line interruption would result in the failure of a pixel.

A clean room, or an ultra-clean room, is a room in which the concentration of airborne particles is controlled. It is constructed and used in such a manner that the number of particles introduced into the room or produced and deposited in the room is as small as possible, and other parameters, such as temperature, humidity or air pressure, are controlled as required.

On the one hand, TFT screens are currently becoming less and less expensive, and on the other hand the demand for screens with enormous proportions is increasingly standing out, all the more so because screens of this type firstly can be used very easily at major events and secondly are available in affordable price ranges due to modern production technology.

However, the production of large screens requires the use of special machines even in ultra-clean rooms to handle the large-surface-area, thin glass plates required in this case.

For this purpose, it is possible to use primarily multi-axle industrial robots.

The use of a wide variety of embodiments of multi-axle industrial robots in technology for producing a wide variety of products can be gathered from the prior art. Industrial robots of this type are used in large halls mostly for transporting unmanageable and heavy loads, but can also be used beneficially in the production of smaller machine parts. What matters in all cases is the reproducible precision of the movement sequences of the individual grasping operations, transport movements and setting-down operations.

Here, the conditions in which these movement sequences take place are unimportant in many cases. For example, it is mostly immaterial which noise emission such a movement sequence causes, or whether such an operation is associated with the movement of dust or a more or less large escape of lubricant. Unavoidable abrasion of moving machine parts which cause friction is also mostly unremarkable.

By contrast, natural ramifications of this type must be taken into consideration when working in an environment at risk from contamination, for example in the food-processing industry, in the pharmaceutical industry or even in the production of semiconductors in ultra-clean rooms.

Thus, EP 1 541 296 A1 discloses a manipulator, such as an industrial robot, for use in an environment at risk from contamination, having a number of scavenging chambers, which can be charged with a scavenging medium, in the region of drive units of the manipulator. The object to be achieved in the case of such a device is to further develop the device to such an extent that the manipulator can safely be used in an environment at risk from contamination in a structurally simple manner and therefore, in particular, at low cost.

This object is achieved by a dedicated scavenging chamber being associated with each of a plurality of groups of drive units (claim 1).

Although the environment in which such an industrial robot is to be used is more sensitive to contamination and therefore also places higher demands on the design configuration compared to a normal environment, special demands of this type cannot be compared with the conditions demanded in ultra-clean rooms.

DE 20 2007 003 907 U1 discloses an apparatus for automatically sorting glass plates. This document describes, inter alia, an orienting apparatus (1) which orients the glass plates with respect to a left-hand and/or a right-hand abutment strip (7) via controllable rollers (8), wherein the orienting apparatus (1) comprises two frame roller carriers (10) which can each be rotated separately about a pivot bearing (5). Apart from the fact that this orienting apparatus (1) is not intended for operation in ultra-clean room conditions, in this case the orientation of thick and relatively stable glass plates takes place via impetuous abutments on two abutment strips (7). This is a completely unsuitable orientation process for the orientation of thin glass plates at risk from breaking. This document provides no indication of the particularly smooth, sliding orientation of thin, shock-sensitive glass plates according to the invention.

In the apparatus for transferring and stacking plates described in DE 19 18 791 A, the transfer speed and the stacking speed of plates should be increased considerably compared to a stacking operation according to the prior art, which is partially assisted manually. This is achieved substantially in that the lifting or inverting of each plate is performed in two steps. In order to make it possible to handle the respective plate in the process described here, said plate is connected fixedly by means of a suction device (4), fed to different rotatable carrying devices and moved into different horizontal and inclined positions until it is finally transferred to a stacking portion (11). This document provides no indication of the smooth and soft orientation of thin, shock-sensitive glass plates in ultra-clean room conditions.

DE 10 2005 039 453 A1 further discloses a modular processing system for flat substrates. In order to be protected from dirt, flat substrates of this type, for example TFT screens, are reliant upon enclosures for handling in special atmospheric conditions. According to the invention proposed in this document, an enclosure of the processing system is dispensed with; for this reason, however, the modular processing system is provided with a transfer system which makes both quick access to the individual modules and quick transfer between the individual modules possible, and which makes it possible for the substrates to be transferred between the modules even under ultra-clean room conditions. This is achieved in that the transfer unit has a transfer chamber which accommodates the substrate rest and is in the form of an enclosure, such that the size of the enclosure can be reduced to the size of the substrate, and thus to the imperative size. Although these are measures for optimizing a processing system in a certain way in ultra-clean room conditions, this document does not deal with the topic of orienting thin, shock-sensitive glass plates.

Apart from what has been mentioned above, large, thin glass plates such as those used for producing large TFT screens are extremely sensitive to very small shocks owing to their structure and concurrent relatively large mass. Therefore, an industrial robot is also unsuitable for handling large, thin glass plates in ultra-clean rooms because it lacks sensitivity and in some cases may lack positional accuracy.

In ultra-clean room conditions, the transfer of large, shock-sensitive glass plates from the horizontal orientation to a vertical orientation requires particular care and attention.

A further aspect to bear in mind when maintaining ultra-clean room conditions, particularly when producing expensive products, is the risk of contamination by people. Here, unintended sneezing can destroy a whole production unit. Likewise, such a system requires increased reliability. Since the costs for purchasing and operating an appropriately configured industrial robot are high, a favorable price of such a system is also important.

Particularly when handling large-surface-area glass plates using an industrial robot, it may be observed that large surfaces such as these tend to vibrate as a result of the movement. This can firstly be caused by the suction elements adhering only at a few points and secondly by the accelerated movement sequences of such robots. Vibration phenomena such as these bring the additional risk of glass breakage.

SUMMARY OF THE INVENTION

Therefore, the apparatus according to the invention and, respectively, the process according to the invention are based on the object of ensuring a production process, or a delivery to a specific production process, which takes place without intervention by people, but controlled and monitored by people outside the production, in the orientation and positioning of large, thin glass plates in ultra-clean room conditions. The corresponding apparatus has to be reliable and inexpensive to produce. The movement sequences of the glass plates have to rule out undesirable vibrations.

This object is achieved by an apparatus as claimed in claim 1 and by a process as claimed in claim 9.

BRIEF DESCRIPTION OF THE DRAWINGS

The apparatus according to the invention is described in more detail below.

In detail:

FIG. 6: is a spatial illustration of the transfer unit and the setting-down apparatus.

DETAILED DESCRIPTION

For ultra-clean rooms, as are also used in microelectronics, there are a plurality of hierarchical areas with a corresponding clean room class. Thus, the ultra-clean room (class 10 and better), in which substrates are being processed, is surrounded by a separate area with the systems required for coating and structuring. Pumps required for vacuum technology are usually located on an underlying story.

Access is usually gained to the ultra-clean room through a sequence of different clean room areas with a decreasing clean room class. A change of clothes is generally required between these areas. In order to minimize soiling by items which come into contact with the floor (e.g. soles of a shoe), special sticky foot mats are located at each of the access points. Access to the ultra-clean room itself is gained additionally through air locks for people and materials in which, in turn, strong air flows and filter systems whirl up and extract particles which are present, such that no additional contamination is brought in from outside.

Materials which are used in clean rooms have to have abrasion-resistant surfaces. Systems and devices which have been erected may only cause minimum disruption to the laminar air flow. A clean room is generally subjected to overpressure (overpressure ventilation).

The glass plates (9) used in the ultra-clean room are cleaned in one of the preceding rooms and packed in a plurality of protective covers.

These protective covers are then removed again, depending on the respective processing operation of the glass plates (9) and depending on the clean room conditions or ultra-clean room conditions required.

The glass plates (9) access the room in which the orientation and positioning according to the invention take place through an air lock, through which a roller conveyor passes.

Figure 1:
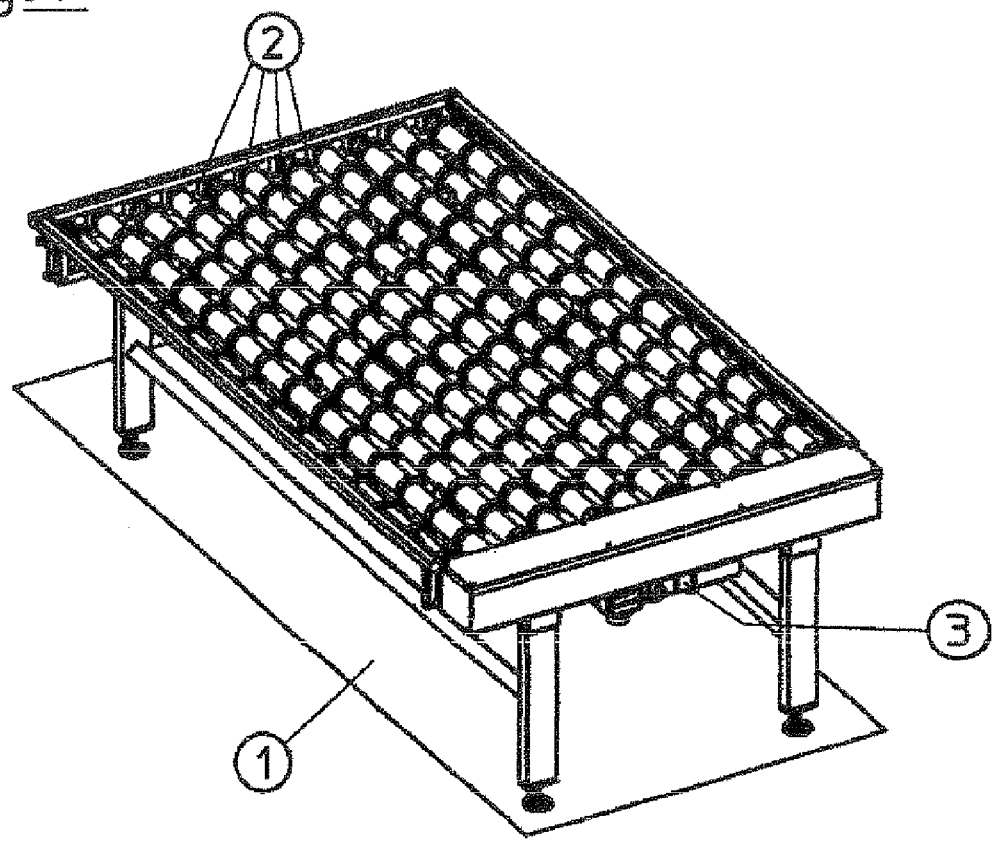
FIG. 1: is a spatial illustration of a roller conveyor.

A roller conveyor of this type comprises a sequence of parallel rollers (2), as shown in FIG. 1. Here, each roller (2) is operated via a dedicated bevel gear and a drive (3) common to all of the rollers, as can be seen from FIG. 1. The roller conveyor can be mounted on a base plate (1).

Figure 2:
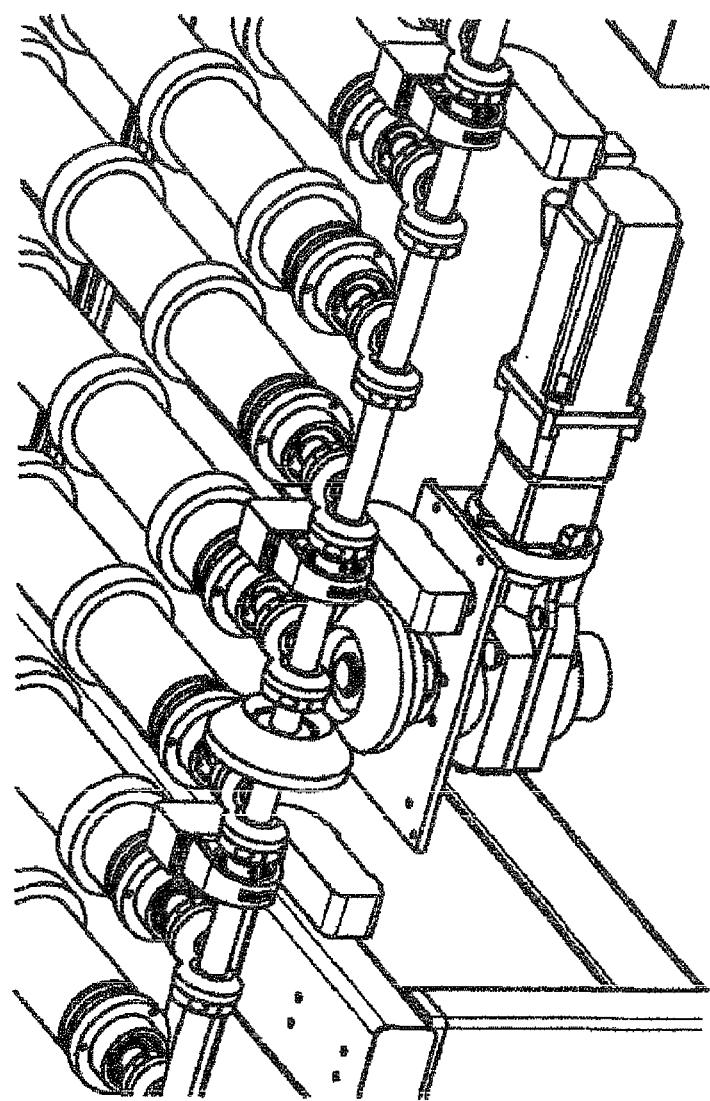
FIG. 2: is an illustration of the roller drive.

FIG. 2 shows a detailed illustration of such a drive. It can be seen here that an elongate drive motor with a downstream angular gear mechanism uses a large bevel gear to drive a smaller bevel gear on a central shaft. This central shaft is mounted at a plurality of locations and, in the region of each roller (2), supports a smaller bevel gear, which drives a further bevel gear seated directly on the respective roller (2). This construction is inexpensive and makes reliable operation possible for many years. The use of bevel gear drives ensures that a high level of operational reliability is achieved together with inexpensive production.

The bearings of these rollers (2) are designed in accordance with the clean room conditions required.

However, a roller conveyor of this type may also comprise a sequence of rollers each with a dedicated electromotive drive and a dedicated control system, or may be provided with bevel gears which are each driven in groups. Roller conveyors are used whenever it is necessary to transport one or more glass plates (9) to the next intended location.

Figure 3:
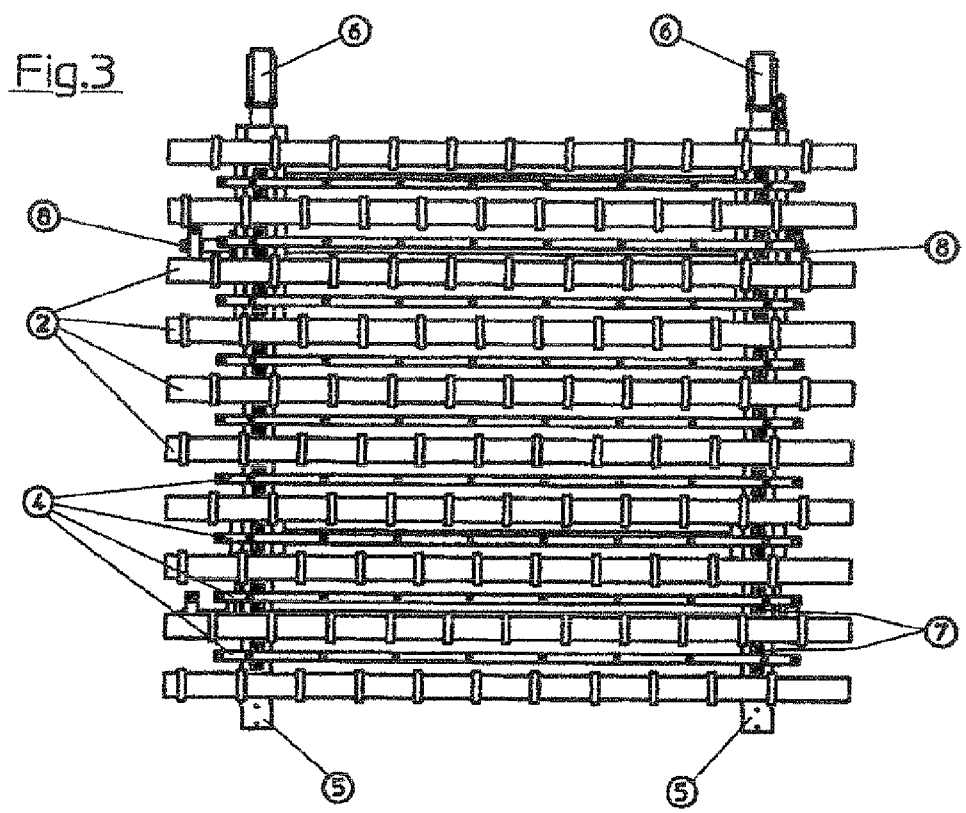
FIG. 3: is a plan view of the roller conveyor and the orienting unit.

If the respective glass plate (9) then reaches the region of the orienting unit, as shown in FIG. 3, its position is detected by sensors and the glass plate (9) is brought to a stop in a preliminary position. FIG. 3 shows such an operation from above; the glass plate is omitted for reasons of clarity.

A wide variety of types and arrangements of sensors of a wide variety of constructions which are familiar to a person skilled in the art can be used as sensors, depending on the respective requirements.

For the actual orientation of a glass plate (9), a lifting frame (8) bearing an orienting frame (5) is raised underneath the rollers, the orienting frame in turn bearing cross braces (4) with support elements which pass through the free space between the rollers and protrude beyond the support level of the rollers.

The lifting frame (8) is raised using a dedicated drive which brings about the deflection of lifting elements via a lever linkage and the shortening of a threaded rod. However, it is also possible to employ other options which are known to a person skilled in the art, have a lifting action and are compatible with the conditions in the ultra-clean room.

The orienting frame (5) bears support elements which are fastened on rotatably mounted cross braces (4), have an anti-marking surface, make contact with the glass plate (9) on the underside and thereby bear the latter.

The orienting frame (5) is firstly displaceably mounted on displacement supports via displacement elements which can be driven individually by drives (6), as a result of which the two longitudinally extending crossbeams of the orienting frame (5), which are connected in an articulated manner to the rotatably mounted cross braces (4), can be arranged in different positions.

This ensures that the orienting frame (5) can not only be displaced in parallel as a whole and thus finely adjusted, but can also be shifted into an inclined position like a parallelogram, and the orienting frame (5) moves the glass plate (9) resting on the support elements into the desired position in a shock-free manner.

The precise positioning of the glass plate (9) can be monitored using line lasers or markings, the position of which is monitored using lasers and/or sensors.

A glass plate (9) can therefore be positioned with the greatest possible precision and fed for further processing in ultra-clean room conditions.

This is achieved in that, after the operation for the precise orientation of the glass plate (9), monitored by sensors, the lifting frame (8) is lowered to such an extent that the glass plate (9) rests on the rollers again.

The spaces shown in FIG. 3 between the rollers (2), on the one hand, and the cross braces (4), which are positioned on the orienting frame and the push-away elements of which pass through between the rollers (2) and are displaced between them, can be set in each case on the basis of the displacement movements to be expected.

In practice, however, small orienting movements of a glass plate (9) are to be expected, such that the corresponding spaces between the rollers (2) suffice for the alignment of a glass plate (9) to be typically oriented.

Figure 4:
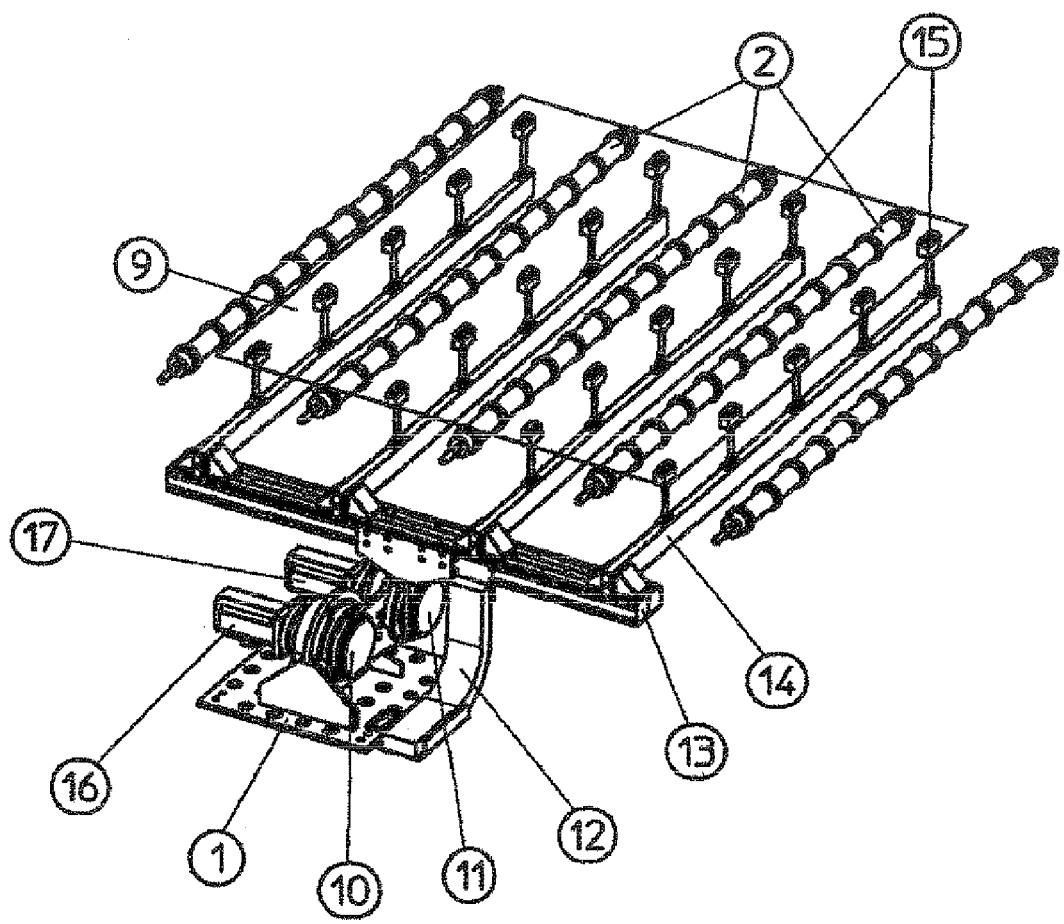
FIG. 4: is a spatial illustration of the roller conveyor and the transfer unit.

FIG. 4 is a perspective illustration of a glass plate (9) on a transfer apparatus according to the invention. It can be seen in FIG. 4 how the rollers (2), along which the glass plates (2) are guided horizontally on the transfer apparatus, have conveyed a glass plate (2) into the region of the transverse strut (13) of the transfer fork and the suction head support struts (14) connected thereto at right angles. The suction head support struts (14) run substantially parallel to the rollers (2). The precise positioning of the glass plate (9) can be monitored using line lasers or markings (not shown separately), the position of which is monitored using lasers and/or sensors.

A glass plate (9) can therefore be transferred with the greatest possible precision and fed for further processing in ultra-clean room conditions.

It can also be gathered from FIG. 4 that the transfer apparatus is anchored to the floor with a fastening plate (1). The transverse strut (13) of the transfer fork is mounted on the fastening plate (1) via a fastening element and also an upper deflection gear mechanism (11) and a lower deflection gear mechanism (10) connected thereto via a crossbeam at a particular spacing. Here, the upper deflection gear mechanism (11) is driven by the upper servo drive (17), and the lower deflection gear mechanism (10) is driven by the lower servo drive (16).

By way of example, four suction head support struts (14) each with five suction heads (15) are shown on the transverse strut (13) of the transfer fork.

Before the transfer operation, the suction heads (15) are attached fixedly to the relevant glass plate (9) by suction, and connect it to the transfer apparatus. The flexible service duct (12) is encapsulated in an emission-free manner and additionally has a dedicated suction extraction system.

Figure 5:
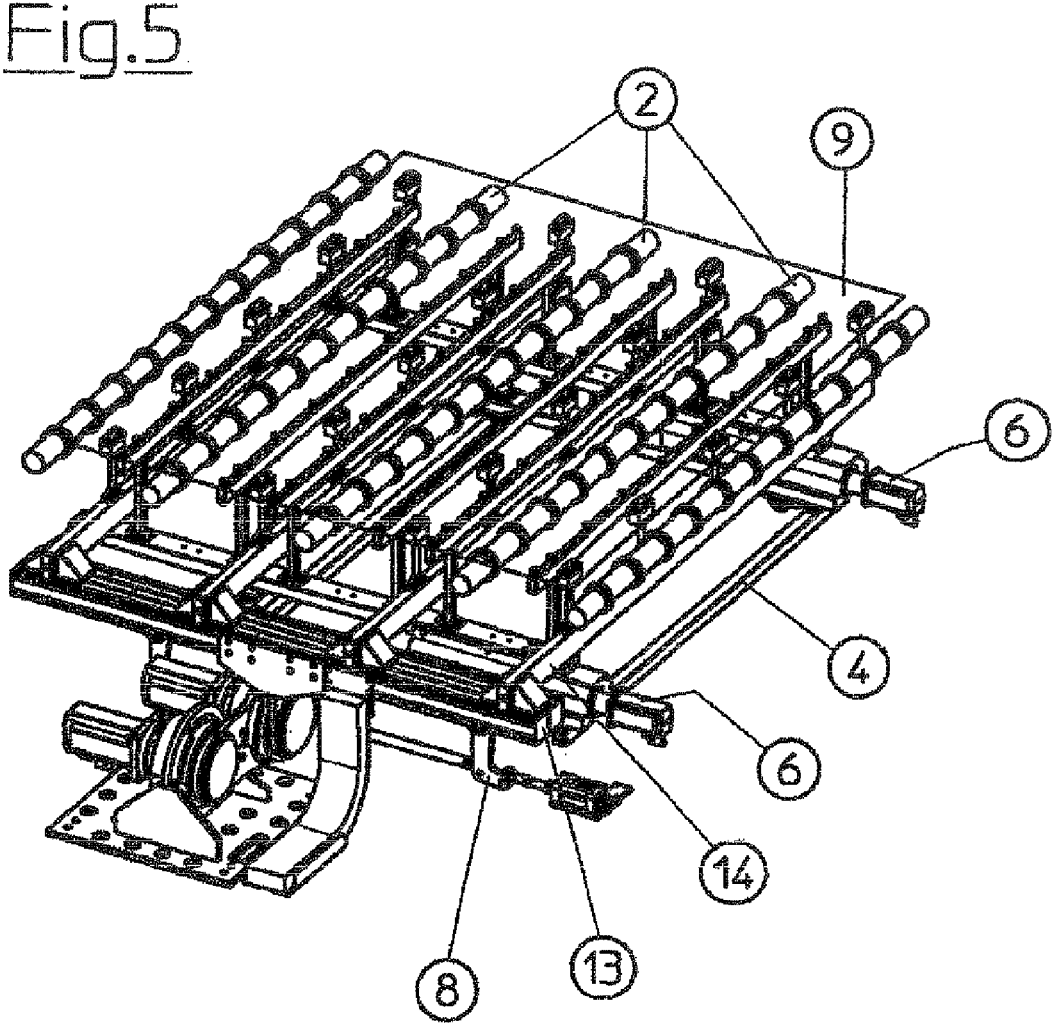
FIG. 5: is a spatial illustration of the roller conveyor, the orienting unit and the transfer unit.

FIG. 5 is a drawing showing a combination of an orienting apparatus according to the invention and a transfer apparatus according to the invention.

It can be seen in the perspective view in FIG. 6 how the glass plate (9), held by the suction heads (15), has been pivoted into an upright position in the region of the setting-down apparatus (18).

The actual pivoting operation from the horizontal position into the required vertical position is substantially carried out here using the lower deflection gear mechanism (10). A glass plate (9) can then be finely adjusted further both in the horizontal direction and in the vertical direction using the upper deflection gear mechanism (11).

A glass plate (11) then remains in the setting-down apparatus (18) until the coating operation according to the actual intended use.

For adaptation to different conditions in terms of the dimensions of the glass plates to be transferred and in terms of setting-down apparatuses of different dimensions, it can be provided that the crossbeam which connects the lower deflection gear mechanism (10) and the upper deflection gear mechanism (11) is configured in such a way that the distance between these two deflection gear mechanisms (10, 11) can be changed by motor. The current positions of the relevant system parts can be detected by control technology by sensors in order to be monitored on a screen. The comparative detection of positions of the system parts and positional data of glass plates (9) makes it possible to perform precise desired/actual comparisons and to achieve precise positioning results.

In order to provide a clear illustration, the corresponding system parts are not shown.

A suction head (15) substantially comprises a spacer bushing which, at its lower end, bears a screw connection which is adapted to the ultra-clean room conditions and by which said spacer bushing is connected to the suction head support strut (14). The interior of a suction head (15) is provided with a flow sensor which detects the air flow flowing through a suction element and forwards the measurement values determined by it in order to control the transfer apparatus.

A suction element of this type substantially consists of a special high-performance material, known by the abbreviation PEEK.

This plastic is preferably also used for other parts exposed to abrasion, e.g. the support of the rollers (2).

The apparatus according to the invention is less expensive to produce than a corresponding system with an industrial robot, and ensures a high degree of freedom from contamination; it also meets high demands with respect to operational reliability and fail safety.

Particularly when treating large-surface-area and thin plates, as will be used in the future for the production of large-surface-area screens and solar systems, the apparatus according to the invention largely prevents undesirable vibration during the movement sequences and greatly reduces the risk of breakage.

A process which protects the sensitive glass plates as they are transferred to the setting-down apparatus (18) is achieved in that the glass plate (9) is first moved toward the setting-down apparatus (18) via the deflection gear mechanisms (11, 10) and then, after any vibration which may occur has subsided, fine adjustment takes place by moving the glass plate slowly into the final position required for further processing.

Likewise, the apparatus according to the invention can be used to convey the glass plates (9), after they have been coated in the vertical position, back from the setting-down apparatus (18) to a horizontal position using a transfer apparatus, and to place said plates on a roller conveyor for the further production process.

In this context, it should be noted that the metallic setting-down apparatus (18) is exposed to considerable temperature elevations during the processing of the glass plates (9), these temperature elevations distorting said apparatus and thus displacing the position of the glass plate (9). However, the laws according to which such displacement takes place are known in physical terms and can therefore be determined mathematically. Therefore, measurement of the temperature of the setting-down apparatus (18) can provide a remedy here, in so far as the resultant change in position of the glass plate (9) can be taken into account, as a known variable, in the processing operation.

The interactive control of the movement elements and sensors used in each case requires a special control program.

List of Reference Numerals (1) Base plate, fastening plate
(2) Roller
(3) Drive on the roller conveyor
(4) Cross braces, accommodation of push-away elements
(5) Orienting frame
(6) Drive of the displacement elements
(7) Rotary joints of the orienting frame
(8) Lifting frame for orienting unit
(9) Glass plate
(10) Lower deflection gear mechanism
(11) Upper deflection gear mechanism
(12) Secured, flexible service duct
(13) Transverse strut of the transfer fork
(14) Suction head support strut
(15) Suction head
(16) Lower servo drive
(17) Upper servo drive
(18) Setting-down apparatus

The invention claimed is:

1. An apparatus for the contamination-free, precisely defined horizontal orientation and positioning of thin, shock-sensitive crystalline plates, in particular glass plates (11), in ultra-clean room conditions, said apparatus comprising:
   a) a roller conveyor with rollers (2) and a drive (3) common to all of the rollers,
   b) an orienting unit with a lifting frame (8) and an orienting frame (5) lying thereon, wherein the orienting frame (5) has longitudinally extending cross braces (4) which are connected thereto in an articulated manner such that they can rotate, have support elements and pass through the free space between the rollers (2), protrude beyond the support level of the rollers (2) and support the glass plate (9),
   c) two laterally moving slide elements which are operated by drives (6), which are each individually controllable, and each coupled to said cross braces via rotary joints (7).

2. The apparatus as claimed in claim 1, wherein the drives of the roller conveyor are in the form of bevel gear drives.

3. The apparatus as claimed in claim 1 wherein the lifting frame (8) is raised using a drive which brings about the deflection of lifting elements via a lever linkage and the shortening of a threaded rod.

4. The apparatus as claimed in claim 1, wherein the support elements on the cross braces (4) are produced from polyether ether ketone plastic.

5. The apparatus as claimed in claim 1, wherein the mechanically moving parts are encapsulated in an emission-free manner and are produced from abrasion-resistant material.

6. The apparatus as claimed in claim 1, wherein the positioning of the glass plate (11) is monitored using lasers and/or sensors.

7. The apparatus as claimed in claim 1, wherein a flexible service duct. (12) has a dedicated suction extraction system.

8. A process for the contamination-free, precisely defined horizontal orientation and positioning of thin, shock-sensitive crystalline plates, in particular glass plates (9), in ultra-clean room conditions, said process comprising:
   a) conveying, in an ultra-clean room, a glass plate (9) on an orienting unit by a roller conveyor with rollers (2) and a drive (3) common to all of the roller, the rollers (2) being driven by the drive source using bevel gears,
   b) orienting the glass plate (9) by raising a lifting frame (8) with an orienting frame (5) lying thereon from below through the free space between the rollers (2), wherein the orienting frame (5) has longitudinally extending cross braces (4) which are connected thereto in an articulated manner such that they can rotate, have support elements and pass through the free space between the rollers (2), protrude beyond the support level of the rollers (2) and support the glass plate (9),
   c) positioning the glass plate (9) in a shock-free manner via two laterally moving slide elements which are operated by drives (6), which are each individually driveable, and each coupled to said cross braces via rotary joints (7), and
   d) lowering, after the positioning operation, the lifting frame (8) to such an extent that the glass plate (9) rests on the rollers again.

9. The process as claimed in claim 8, wherein the drives of the roller conveyor are in the form of bevel gear drives.

10. The process as claimed in claim 8, wherein the lifting frame (8) is raised using a drive which brings about the deflection of lifting elements via a lever linkage and the shortening of a threaded rod.

11. The process as claimed in claim 8, wherein the support elements on the cross braces (4) are produced from polyether ether ketone plastic.

12. The process as claimed in claim 8, wherein the mechanically moving parts are encapsulated in an emission-free manner and are produced from abrasion-resistant material.

13. The process as claimed in claim 8, wherein the positioning of the glass plate (11) is monitored using lasers and/or sensors.

14. The process as claimed in claim 8, wherein a flexible service duct (12) has a dedicated suction extraction system.

15. A computer program with a program code for carrying out the process steps as claimed in claim 8, if the program is executed on a computer.

16. A machine-readable storage medium with the program code of a computer program for carrying out the process as claimed in claim 8, if the program is executed on a computer.

* * * * *